(12) United States Patent
De Samber et al.

(10) Patent No.: US 12,508,774 B2
(45) Date of Patent: Dec. 30, 2025

(54) SINGLE CAMERA-BASED PROCESS MONITORING IN FDM 3D PRINTER

(71) Applicant: SIGNIFY HOLDING B.V., Eindhoven (NL)

(72) Inventors: Marc Andre De Samber, Lommel (BE); Harry Broers, S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 288 days.

(21) Appl. No.: 18/016,020

(22) PCT Filed: Jul. 12, 2021

(86) PCT No.: PCT/EP2021/069306
§ 371 (c)(1),
(2) Date: Jan. 13, 2023

(87) PCT Pub. No.: WO2022/013141
PCT Pub. Date: Jan. 20, 2022

(65) Prior Publication Data
US 2023/0256680 A1 Aug. 17, 2023

(30) Foreign Application Priority Data
Jul. 16, 2020 (EP) .................................. 20186179

(51) Int. Cl.
B29C 64/393 (2017.01)
B29C 64/118 (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/393; B29C 64/232; B29C 64/118; B29C 64/209; B29C 64/236; B33Y 10/00; B33Y 30/00; B33Y 50/02
See application file for complete search history.

(56) References Cited

U.S. PATENT DOCUMENTS 10,022,917 B2 7/2018 Pax
2013/0205920 A1 8/2013 Tow
(Continued)

FOREIGN PATENT DOCUMENTS

CH 692847 A5 * 11/2002 .......... B41F 33/0036
CN 107263858 A * 10/2017 ............. B26D 5/005
(Continued)

OTHER PUBLICATIONS

Nuchitprasitchai, Siranee et al., "Factors Effecting Real-Time Optical Monitoring of Fused Filament 3D Printing," Research Gate, www.researchgate.net/publication/318174889, Jun. 2017 (29 Pages).
(Continued)

*Primary Examiner* — Nahida Sultana

(57) ABSTRACT

The invention provides a fused deposition modeling 3D printer (500), comprising (i) a printer head (501), (ii) a 3D printable material providing device (575), (iii) an actuator (610) for moving one or more of (a) the printer head (501) and (b) a receiver item (550), (iv) an optical sensor (620), and (v) n optical elements (630), wherein n≥1; wherein:-in an operational mode of the fused deposition modeling 3D printer (500) the optical sensor (620) senses one or more of (i) reflection of radiation (11) at 3D printed material (202) on the receiver item (550), (ii) reflection of radiation (11) at at least one of the n optical elements (630), and (iii) transmission of radiation (11) through at least one of the n optical elements (630), thereby sensing at least part of a space between the receiver item (550) and the printer head (501);-during the operational mode at least one of the group of
(Continued)

optical elements (630) and the optical sensor (610) are configured at equal heights or higher than a printer nozzle (502) functionally coupled to the printer head (501).

12 Claims, 3 Drawing Sheets

(51) Int. Cl.
  *B29C 64/209* (2017.01)
  *B29C 64/232* (2017.01)
  *B29C 64/236* (2017.01)
  *B33Y 10/00* (2015.01)
  *B33Y 30/00* (2015.01)
  *B33Y 50/02* (2015.01)

(52) U.S. Cl.
  CPC .......... *B29C 64/232* (2017.08); *B29C 64/236* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2014/0117575 A1 | 5/2014 | Kemperle et al. | |
| 2017/0057170 A1 | 3/2017 | Gupta et al. | |
| 2017/0235293 A1* | 8/2017 | Shapiro | B23K 26/082 700/166 |
| 2017/0355147 A1 | 12/2017 | Buller et al. | |
| 2018/0297113 A1 | 10/2018 | Preston et al. | |
| 2019/0299523 A1 | 10/2019 | Wu et al. | |
| 2020/0110025 A1* | 4/2020 | Yacoubian | G01N 21/4788 |
| 2020/0130299 A1 | 4/2020 | Ur | |
| 2021/0365016 A1* | 11/2021 | Hasanian | G01N 29/4472 |
| 2021/0402481 A1* | 12/2021 | Stecker | B22F 10/28 |
| 2023/0166452 A1* | 6/2023 | Decrop | B29C 64/386 700/100 |
| 2023/0391008 A1* | 12/2023 | Bonilla | B29C 64/343 |

FOREIGN PATENT DOCUMENTS

| | | |
|---|---|---|
| CN | 110757787 A | 2/2020 |
| EP | 3318389 A1 | 5/2018 |

OTHER PUBLICATIONS

Petsiuk, Aliaksei, et al., "Open Source Computer Vision-Based Laser-Wise 3D Printing Analysis," Cornell University Publication, No. Date Provided (29 Pages), (yr 2020).

\* cited by examiner

SINGLE CAMERA-BASED PROCESS MONITORING IN FDM 3D PRINTER

CROSS-REFERENCE TO PRIOR APPLICATIONS

This application is the U.S. National Phase application under 35 U.S.C. § 371 of International Application No. PCT/EP2021/069306, filed on Jul. 12, 2021, which claims the benefit of European Patent Application No. 20186179.6, filed on Jul. 16, 2020. These applications are hereby incorporated by reference herein.

FIELD OF THE INVENTION

The invention relates to a 3D printer and to a method for producing a 3D item (with such 3D printer).

BACKGROUND OF THE INVENTION

Control systems for 3D printing are known in the art. US2017/0355147, for instance, describes an apparatus for printing one or more three-dimensional objects comprising a controller that is programmed to: (a) direct a first energy source to generate a first energy beam that interacts with an optical window disposed in an enclosure in which the one or more three-dimensional objects are generated by three-dimensional printing, wherein the controller is operatively coupled to the first energy source; (b) direct at least one processing unit to process a signal indicative of an alteration in the first energy beam, wherein the alteration in the first energy beam is prognostic of a change in a cleanliness of the optical window, wherein the controller is operatively coupled to the at least one processing unit; and (c) evaluate a result to determine an adjustment to the three-dimensional printing considering the alteration in the first energy beam.

EP 3318389A1 discloses a system for thermal control of additive manufacturing. A mirror-positioning system is configured to actively direct the laser (the heat source) to discrete sections of a part (printable material) during manufacturing. A thermal sensor is used to measure the heat and the laser source is then adjusted based on the thermal sensor reading. The mirror-positioning system is also configured to actively move a location on the part being sensed by the thermal sensor.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

A relevant quality control of 3D printed items appears to be the monitoring of the 3D printing process itself. This may allow intervening when something goes wrong, preventing damage to the printer if the process goes wrong (e.g. if the filament is not attaching properly), or taking care of downtime of the machine (so printing can be stopped or corrected when an anomaly occurs and a new print might be started soon after). One might use advanced systems monitoring different parts of the 3D printer with different sensors, but this may be complicated and may also lead to an undesired use of necessary space.

Hence, it is an aspect of the invention to provide an alternative 3D printing apparatus which preferably further at least partly obviate(s) one or more of above-described drawbacks. The present invention may have as object to overcome or ameliorate at least one of the disadvantages of the prior art, or to provide a useful alternative.

Hence, in a first aspect the invention provides a fused deposition modeling ("FDM") 3D printer ("printer" or "FDM printer" or "3D printer"). Especially, the 3D printer, comprises a printer head, an actuator for moving one or more of (a) the printer head and (b) a receiver item, as well as an optical sensor ("sensor"). Further, the 3D printer may comprise n optical elements, wherein n≥1. Yet further, the 3D printer may comprise a 3D printable material providing device. In embodiments, in an operational mode of the fused deposition modeling 3D printer the optical sensor may especially sense one or more of (i) reflection of radiation at 3D printed material on the receiver item, (ii) reflection of radiation at at least one of the n optical elements, and (iii) transmission of radiation through at least one of the n optical elements. In this way, the sensor may sense at least part of a space between the receiver item and the printer head. Further, in specific embodiments during the operational mode at least one of the group of optical elements and the optical sensor are configured at equal heights or higher than a printer nozzle functionally coupled to the printer head. Hence, in embodiments the invention provides a fused deposition modeling 3D printer, comprising (i) a printer head, (ii) a 3D printable material providing device, (iii) an actuator for moving one or more of (a) the printer head and (b) a receiver item, (iv) an optical sensor, and (v) n optical elements, wherein n≥1; wherein: (I) in an operational mode of the fused deposition modeling 3D printer the optical sensor senses one or more of (i) reflection of radiation at 3D printed material on the receiver item, (ii) reflection of radiation at at least one of the n optical elements, and (iii) transmission of radiation through at least one of the n optical elements, thereby sensing at least part of a space between the receiver item and the printer head; and (II) during the operational mode at least one of the group of optical elements and the optical sensor are configured at equal heights or higher than a printer nozzle functionally coupled to the printer head.

With such 3D printer, it is possible to monitor different parts, also parts that are not directly in line of sight (LOS) of the optical sensor, e.g. due to the 3D printed material that is provided on the receiver item or because other elements may be blocking part of the line of sight. With the one or more optical elements, the space that can be sensed by the sensor may be substantially increased. With one or more indirect lines of sight, the sensed space may substantially be increased. This also allows the use of a limited number of sensors, or even only a single sensor. This does not only reduce costs, but also provides more space, reduces the number of critical components, and may make the 3D printer less complex. Especially for smaller 3D printers, like those having an enclosure volume smaller than about 1 m$^3$, like for home use or for use in local rapid prototyping or 3D print shops, the invention may be used. However, the invention may also be applied for industrial type of 3D printing. Further, the invention may solve the problem of the negative impact of high temperatures on the optical sensor and/or pollution of critical components of the optical sensor. Yet further, the optical element(s) used may be easily replaceable. With the present invention, the 3D printing process may be monitored, and the process may be terminated when problems are sensed.

As indicated above, the invention provides a 3D printer comprising a printer head. The printer head may be functionally coupled to a printer nozzle, from which 3D printable material may be extruded, to provide 3D printed material on the receiver item. Hence, the 3D printer may further comprise a printer nozzle. In specific embodiments, the 3D printer may be a multi-nozzle printer. In such embodiments, the 3D printer may comprise two or more printer heads and/or a printer head may comprise more than one printer nozzle. Printer nozzles may in specific embodiments be replaceable connected to the printer head.

Further, the 3D printer may comprise a 3D printable material providing device. Especially, the 3D printable material providing device may be functionally coupled to the printer nozzle and/or the printer head. The 3D printable material providing device may provide a filament of 3D printable material to the printer head and/or printer nozzle. In embodiments, a filament of 3D printable material may be used as such. In yet other embodiments, such filament is created by the 3D printer from 3D printable material. Especially, the 3D printable material providing device is controlled by a control system (see also below).

Yet further, the 3D printer comprises an actuator for moving one or more of (a) the printer head and (b) a receiver item. The term "actuator" may also refer to a plurality of (different) actuators. An actuator may be used for moving in the xy-direction and the same or another actuator may be used for moving in the z-direction.

The actuator may be configured to move the printer head (in a height direction). Alternatively or additionally, the actuator may be configured to move the receiver item (in a height direction). In the former embodiment, it may be useful when for one or more of the optical sensor the n optical elements are mechanically coupled to the printer head. In the latter embodiment, i.e., wherein the actuator may be configured to move the receiver item, the optical sensor and the n optical elements may be configured stationary, e.g. mechanically coupled to (essentially) non-moving elements like e.g. to one (or more) of the printer head (which is in this embodiment stationary), a suction hood, an enclosure, etc., Especially, the actuator is controlled by a control system (see also below).

The 3D printer may further comprise the optical sensor (or "optical detector", or "detector", or "sensor"). The optical sensor is especially configured to sense one or more wavelengths selected from of UV radiation, visible radiation, and infrared radiation. Especially, the optical sensor is configured to sense one or more wavelengths selected from visible and or IR, even more especially at least one or more wavelengths selected from visible radiation.

The terms "visible" light or "visible emission" refer to radiation (herein especially indicated as "light") having a wavelength in the range of about 380-750 nm. Herein, UV (ultraviolet) may especially refer to a wavelength selected from the range of 200-380 nm, though in specific embodiments other wavelengths may also be possible. Herein, IR (infrared) may especially refer to radiation having a wavelength selected from the range of 780-3000 nm, such as 780-2000-nm, e.g. a wavelength up to about 1500 nm, like a wavelength of at least 900 nm, though in specific embodiments other wavelengths may also be possible. Hence, the term IR may herein refer to one or more of near infrared (NIR (or IR-A)) and short-wavelength infrared (SWIR (or IR-B)), especially NIR. Examples of optical sensors are further described below.

In embodiments, the sensor may sense at essentially a single wavelength. In yet other embodiments, the sensor may sense at a plurality of different wavelengths. Yet further, in embodiments the sensor may be configured to sense a specific polarization, and in other embodiments the sensor may be configured to sense different polarizations, such as different polarizations at different parts of the sensor and/or different polarizations over time (such as a time dependent polarization). For instance, using polarization may allow detection of stress build up in the polymer material.

The optical sensor may have a line of sight. Here, the term "line of sight" of the optical sensor refers to the line of sight of the optical sensor as such or to the line of sight of the optical sensor with downstream of the optical sensor a second optical element. As will be elucidated below, the second optical element may comprise e.g. a diffractive element or a polarizer element. This line of sight may not allow detection of all relevant parts of a space wherein the 3D item is generated. For instance, elements like the printer head, the printer nozzle, and 3D printed material, may block part of the line of sight.

Hence, yet further the fused deposition modeling 3D printer may comprise n optical elements. Especially, n≥1. More especially, n≥1. In specific embodiments, n≤10, such as n≤8. Especially, at least one of the optical elements is in a direct line of sight of the optical sensor. When there are two optical elements, especially each of these may be in a direct line of sight of the optical sensor. When there are more than two optical elements, especially at least two may be in a direct line of sight of the optical sensor. In specific embodiments, all n optical elements are in a direct line of sight of the optical sensor. Alternatively or additionally, two or optical elements are configured to provide a direction line of sight as a series of optical elements. Hence, the optical sensor may receive reflection received at an optical element via one or more intermediate optical elements. Hence, two or more optical elements may together form a pathway that may provide a line of sight to the optical sensor.

Hence, the optical sensor may sense the 3D printed item (under construction) directly, due to reflection of one or more of UV, VIS, and IR at the 3D printed item (under construction). Note that the term "reflection" herein may in fact also refer to the absence of reflection, i.e. absorption. Further, the term "reflection" may also refer to a change in reflection. The term "reflection" may also refer to "reflections". Hence, when absorption changes, reflection will also change. When the 3D printed item increases in height, reflection may also change. However, such reflection may also be received at the optical sensor via one or more of the one or more optical elements. Alternatively or additionally, would one or more of the optical elements be transmissive for one or more of UV, VIS, and IR, reflection from the 3D printed item (under construction) may also be received via the light transmissive optical element(s). In this way, at least part of a space between the receiver item and the printer head may be sensed by the optical sensor, especially in cooperation with one or more optical elements. Hence, in specific embodiments one or more of the optical elements may be waveguiding elements for one or more of UV, VIS, and IR. For instance, in specific embodiments one or more optical elements may be optical fibers.

Hence, one or more of the optical elements may be radiation transmissive and/or one or more of the optical elements may be radiation reflective. Especially, in embodiments at least one of the optical elements is reflective for one or more of UV, VIS, and IR. The phrases "one or more of UV, VIS, and IR", and similar phrases, may herein especially indicate one or more wavelengths selected from the wavelength range defined by one or more of UV, VIS, and IR.

Therefore, in an operational mode of the fused deposition modeling 3D printer the optical sensor may sense one or more of (i) reflection of radiation at 3D printed material on the receiver item, (ii) reflection of radiation at at least one of the n optical elements, and (iii) transmission of radiation through at least one of the n optical elements, thereby sensing at least part of a space between the receiver item and the printer head. Hence, in specific embodiments the optical sensor may be configured to sense one or more of (i) reflection of radiation at 3D printed material on the receiver item, (ii) reflection of radiation at at least one of the n optical elements, and (iii) transmission of radiation through at least one of the n optical elements. Yet further, in embodiments the optical sensor, optionally together with one or more optical elements, or only via one or more optical elements, may be configured to sense at least part of a space between the receiver item and the printer head.

It may be useful when the optical sensor or an optical element, is at about the height of the printer nozzle. In this way, one or more of the extrudate, just deposited 3D printed material, and the printer nozzle (as such) may be monitored. 3D printing errors may then quickly be sensed. Hence, in specific embodiments during the operational mode at least one of the group of optical elements and the optical sensor are configured at equal heights or higher than a printer nozzle functionally coupled to the printer head. Hence, in specific embodiments, at least one of the group of optical elements and the optical sensor may be configured at equal heights or higher than a printer nozzle functionally coupled to the printer head. Alternatively or additionally, in specific embodiments at least one of the group of optical elements and the optical sensor may be configured about the height of the printer head, or just below.

The phrase "group of n optical elements and the optical sensor", and similar phrases, such as "group of optical elements and the optical sensor", may essentially refer to n+1 group members, i.e. the n optical elements and the optical sensor. Hence, one of these may be one of the n optical elements, or the optical sensor. For instance, the phrase "at least one of the group of n optical elements and the optical sensor", in combination with n being 2, may refer to one optical element, or one optical sensor, or two optical elements, or the optical element and the optical sensor, or all optical elements and the optical sensor.

In yet a further aspect, the invention also provides a method for producing a 3D item by means of fused deposition modelling, using a fused deposition modeling 3D printer. As indicated above, especially the fused deposition modeling 3D printer comprises (i) a printer head, (ii) a 3D printable material providing device, (iii) an actuator for moving one or more of (a) the printer head and (b) a receiver item, (iv) an optical sensor, and (v) n optical elements, wherein n≥1. Yet further, especially the method comprises a 3D printing stage comprising layer-wise depositing (an extrudate comprising 3D printable material, to provide the 3D item comprising 3D printed material on the receiver item, wherein the 3D item comprises a plurality of layers of 3D printed material. Yet further, the method may comprise sensing at least part of a space between the receiver item and the printer head with the optical sensor, and the n optical elements. Hence, especially in embodiments the invention provides a method for producing a 3D item by means of fused deposition modelling, using a fused deposition modeling 3D printer comprising (i) a printer head, (ii) a 3D printable material providing device, (iii) an actuator for moving one or more of (a) the printer head and (b) a receiver item, (iv) an optical sensor, and (v) n optical elements, wherein n≥1; wherein the method comprises: (a) a 3D printing stage comprising layer-wise depositing (an extrudate comprising) 3D printable material, to provide the 3D item comprising 3D printed material on the receiver item, wherein the 3D item comprises a plurality of layers of 3D printed material; and (b) sensing at least part of a space between the receiver item and the printer head with the optical sensor, and the n optical elements. As will be further elucidated below, the method may further comprise controlling the 3D printing stage (or the fused deposition modelling printer) in response to a sensor signal of the optical sensor. Especially, in embodiments the method may further comprise detecting 3D print failures on the basis of the sensor signal of the optical sensor and e.g. terminating the 3D printing process, accordingly.

It may be useful, e.g. for extending the space that may be sensed and/or to view different angles, to have one or more of the n optical elements and the optical sensor at different heights. For instance, in embodiments when there is a single optical element, the optical element and the optical sensor may be at different heights. However, this is not necessarily the case.

In embodiments, the optical sensor may be at about the height of the printer nozzle. Especially, in such embodiment the optical sensor may have an optical axis essentially horizontal. Alternatively, the optical sensor may be at the height of the printer head, or higher. Especially, in such embodiments the optical sensor may have an angle with a vertical equal to 0°, or larger, but especially smaller than 90°.

When there are more than one optical elements, i.e. n≥2, then, in specific embodiments during the operational mode at least two of the optical elements and the optical sensor are configured at different heights. Note that here at least three members of a group are available, i.e. the at least two optical elements and the optical sensor. The term "different heights" in this context may (thus) refer to at least two different heights. This may in specific embodiments include three different heights. In general, there will not be more than four different heights, such as at maximum three different heights. The height may be defined relative to a bottom or bottom plat of the 3D printer, or to a support on which the 3D printer is configured, would there not be a bottom or bottom plate.

As indicated above, in embodiments at least one of the group of optical elements and the optical sensor are configured at equal heights of the printer nozzle. Especially, this may imply that the optical sensor or optical element may be just below, or just above, or at essentially the same height. Especially, it may indicate that horizontal rays of radiation parallel to the printer nozzle and close to the printer nozzle may be detected by the optical sensor, either directly, or via one of the one or more optical elements. Such configuration may allow sensing the nozzle or sensing extrudate escaping from the nozzle. Hence, just below, or just above the printer nozzle may scale to about the nozzle opening. Therefore, in embodiments the printer nozzle has a nozzle opening size (d1), wherein the equal height is defined as a maximum height difference of +/-d1 between (a) the at least one of the group of optical elements and (b) the optical sensor and the printer nozzle. Even more especially, the equal height is defined as a maximum height difference in the range of 0*d1-d1 between (a) the at least one of the group of optical elements and (b) the optical sensor and the printer nozzle. Amongst others, this may e.g. allow monitoring the just 3D printed 3D printed material. Alternatively, the equal height may be defined as the vertical distance d2 below the printer head, wherein the vertical distance is at maximum 15%, such as at maximum 10% of the maximum distance between the printer head and the receiver item. Hence, the height may be within a vertical distance from the printer head, with the vertical distance being in the range of 0-15% of the maximum vertical distance between the printer head and the receiver item.

Of course, the optical sensor may also be configured under an angle with a horizontal or vertical, such that an optical axis of the optical sensor is not vertical or horizontal.

As indicated above, especially one or more, even more especially all optical elements are reflective. Hence, in embodiments the n optical elements may comprise reflective optical elements which are reflective for the radiation.

The optical elements may be selected from the group consisting of flat reflectors, spherical reflectors, parabolic reflectors, ellipsoid reflectors and free-form reflectors. In embodiments, the reflectors may include multiple facetted reflectors. The optical elements may also be transparent for radiation. Alternatively or additionally, one or more optical elements may be transmissive and reflective for radiation, like e.g. in the case of the application of total internal transmission (TIR).

As indicated above, the actuator may be configured to move the printer head and/or the receiver item. Especially, the latter option may be desirable as then then the optical element(s) and optical sensor may in embodiments be kept stationary. Hence, in specific embodiments the actuator is configured to move (in a z-direction (and in the xy-plane) the receiver item. Therefore, especially the optical sensor and n optical elements may have a fixed height.

Many 3D printers may include an enclosure in which parts, or even the entire 3D printer is configured. This may amongst others be for protective reasons, e.g. to protect the contents of the enclosure and/or to protect the outside from actions or materials within the enclosure. In such embodiments, the optical sensor may be configured external from the enclosure. This may assist protection of the optical sensor. In such embodiments, at least part of the enclosure may comprise a material that is transmissive for radiation that can be detected by the optical sensor. Light transmissive materials are known in the art, and may e.g. be selected from PMMA, PC, PET, etc., though other light transmissive materials, such as glass, may also be used. Hence, in specific embodiments the fused deposition modeling 3D printer further comprises an enclosure, wherein the printer head is configured within the enclosure, wherein the optical sensor is configured external of the enclosure, wherein the enclosure is transmissive for the radiation. Further, in specific embodiments, one or more of the n optical elements are configured within the enclosure. The optical elements may be easier replaceable or may be less expensive. Hence, these may be configured within the enclosure. In specific embodiments, one or more of the optical elements may be configured replaceable in the enclosure, such with Snap-On/snap-off means, or other detachable types.

In embodiments, the optical sensor is configured at equal height or higher than the printer head, and at least one of the optical elements is configured lower than the printer head. This allows in embodiments directly monitoring one or more of the extrudate, the printer nozzle or one or more top layers of 3D printed material with e.g. the optical sensor, and monitoring lower layers via one or more optical elements. In specific embodiments, the optical sensor is configured at about equal height with the printer head. In yet other embodiments, the optical sensor is configured higher than the printer head. In specific embodiments, the optical sensor is configured over the printer head. Hence, in specific embodiments the optical sensor in combination with at least one of the optical elements may be configured to sense during the operational mode one or more of (i) the printer nozzle, (ii) extrudate escaping from the printer nozzle, and (iii) at least part of 3D printed material on the receiver item.

It may be desirable facilitating separation of images of different parts by the optical sensor. This may allow using a single optical sensor while receiving radiation from different parts. For instance, this may be achieved by using further optics and/or by using different types of radiation to irradiate different parts of the 3D printer (including the 3D printed material). For instance, a prismatic structure may be applied to receive radiation from different optical elements and guide to different parts on the sensor. Alternatively or additionally, radiation having different polarizations and/or different wavelengths (such as different color points) may be provided to different parts of the 3D printer. The sensor, optionally together with the further optical element may discriminate. In this way, e.g. different colors and/or different polarizations may be sensed by the optical sensor, thereby distinguishing between different parts of the 3D printer. Hence, in embodiments the fused deposition modeling 3D printer may further comprise a second optical element configured downstream of the optical sensor, wherein in the operational mode of the fused deposition modeling 3D printer the second optical element is: (a) configured (i) to receive radiation from at least two of the n optical elements and (ii) to guide to different parts of the optical sensor (respectively); and/or configured to temporarily separate different polarizations of the radiation. Hence, in embodiments the optical element may include a switchable polarization filter. In embodiments, the second optical element may be a diffractive element or a polarizer element. Alternative a second optical element that may be used may be selected from wire grid polarizer, wave plates, retarders, quartz-wedge depolarizers, LC polymer depolarizers, vortex retarders, etc. Alternatively or additionally, a second optical element may be selected from wavelength dependent optical filters, such as band filters, etc.

In embodiments, there may be a source of radiation, configured to generate radiation. Hence, in specific embodiments the fused deposition modeling 3D printer may further comprise a radiation device configured to generate radiation, wherein the radiation device is configured to irradiate one or more of (i) the n optical elements, (ii) the 3D printed material on the receiver item, and (iii) the printer nozzle. The term "radiation device" may also refer to a plurality of (different) radiation devices. In specific embodiments, the radiation device may be configured to generate different types of radiation. In yet further specific embodiments, the radiation device may be configured, optionally together with optics, to provide different types of radiation to different parts of the 3D printer, such as different parts within the enclosure. Especially, in such embodiments the radiation is selected from the group consisting of UV radiation, visible radiation, and infrared radiation. Hence, in embodiments the radiation device may be configured to direct different types of radiation to different parts of the fused deposition modeling 3D printer (and the 3D printed material).

When a source of radiation is applied, in specific embodiments, when the 3D printed material is transmissive for the radiation, the optical sensor may also sense radiation that is transmitted through the 3D printed material. Sensing may again in embodiments be directly and/or in other embodiments via one or more optical elements (which may especially be reflective). In this way, en embodiments also wavelength dependent transmission may be sensed.

In specific embodiments, the optical sensor may comprise a camera, such as a CCD camera. In (other) specific embodiments, the optical sensor may comprise one or more of a laser scanner, a LIDAR etc. A laser scanner or LIDAR comprises both the optical sensor as well as a source of radiation. In specific embodiments, the optical sensor may comprise a single-element LIDAR, a time-of-flight sensor (without scanning), a time-of-flight camera, a structured light 3D scanner, a IR distance sensor, etc. In yet other embodiments, the optical sensor may comprise a CMOS camera. In yet other embodiments, the optical sensor may comprise a multi-spectral camera. In yet further embodiments, the optical sensor may comprise a stereo vision camera. In yet further embodiments, the optical sensor may comprise a solid state based diode, such as a Si based photo diode.

As indicated above, with the herein described 3D printer, it may be possible to 3D print in a safe way, as the sensor may sense anomalies. For instance, one or more of the following problems, issues, or anomalies may be sensed: problems with the receiver item, such as pollution, surface irregularities; loss of dimensional accuracy; non-conformance with defined shape; bed levelling issues; blocked nozzle; adhesion problem; print not sticking to the receiver item; print offset or bending; printer stringing; printer oozing; wall carvings in; weak or under-extruded infill; deformed infill; blobs in filament; small features not printing; temperature variations (e.g. when using IR); poor bridging; support falling apart; incomplete infill; cracks; under extrusion; over extrusion; overhangs; missing layers; poor surface quality, gaps between infill and shell, etc.

Hence, in specific embodiments the fused deposition modeling 3D printer may further comprise a control system configured to control the fused deposition modelling printer in response to a sensor signal of the optical sensor. Especially, in embodiments the control system may be configured to detect 3D print failures on the basis of the sensor signal of the optical sensor and to (modify or) terminate a 3D printing process, accordingly. Hence, in embodiments, based on a sensor signal of the optical sensor, the 3D printing process may be switched off. Therefore, with the present 3D printing, a kind of safety valve is provided, which when a printing error is detected, may terminate the printing process. In this way, further printing of a wrongly printed 3D item, or other errors, like continuous printing without stopping (see also errors mentioned herein), etc. may be solved.

Here below, some further aspects are described.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature Tg and/or a melting temperature Tm. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature (Tg) and/or a melting point (Tm), and the printer head action comprises heating the 3D printable material above the glass transition and if it is a semi-crystalline polymer above the melting temperature. In yet another embodiment, the 3D printable material comprises a (thermoplastic) polymer having a melting point (Tm), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc., Optionally, the 3D printable material comprises a 3D printable material selected from the group consisting of Urea formaldehyde, Polyester resin, Epoxy resin, Melamine formaldehyde, thermoplastic elastomer, etc., Optionally, the 3D printable material comprises a 3D printable material selected from the group consisting of a polysulfone.

Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl) acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl) methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl) acrylates and poly($C_{1-6}$ alkyl) methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA).

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc., Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc., Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structures (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one more post processing actions may be executed after removing the printed item from the receiver item. Post processing may include e.g. one or more of polishing, coating, adding a functional component, etc., Post-processing may include smoothening the ribbed structures, which may lead to an essentially smooth surface.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein.

Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided.

The 3D printed item may comprise a plurality of layers on top of each other, i.e. stacked layers. The width (thickness) and height of (individually 3D printed) layers may e.g. in embodiments be selected from the range of 100-5000 μm, such as 200-2500 μm, with the height in general being smaller than the width. For instance, the ratio of height and width may be equal to or smaller than 0.8, such as equal to or smaller than 0.6.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated above when discussing the method. Below, some specific embodiments in relation to the 3D printed item are discussed in more detail.

The (with the herein described method) obtained 3D printed item may be functional per se. For instance, the 3D printed item may be a lens, a collimator, a reflector, etc., The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc., The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc., Alternatively, or additionally, the functional component may comprise a thermal component (e.g. configured to cool or to heat an electrical component). Hence, the functional component may be configured to generate heat or to scavenge heat, etc., As indicated above, the 3D printed item maybe used for different purposes. Amongst others, the 3D printed item maybe used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii)

at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc., In embodiments, the 3D item may be configured as shade. A device or system may comprise a plurality of different 3D printed items, having different functionalities.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, as described above. The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, as further described above.

Especially, the 3D printer comprises a controller (or is functionally coupled to a controller) that is configured to execute in a controlling mode (or "operation mode") the method as described herein. Instead of the term "controller" also the term "control system" (see e.g. above) may be applied.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc., Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc., The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
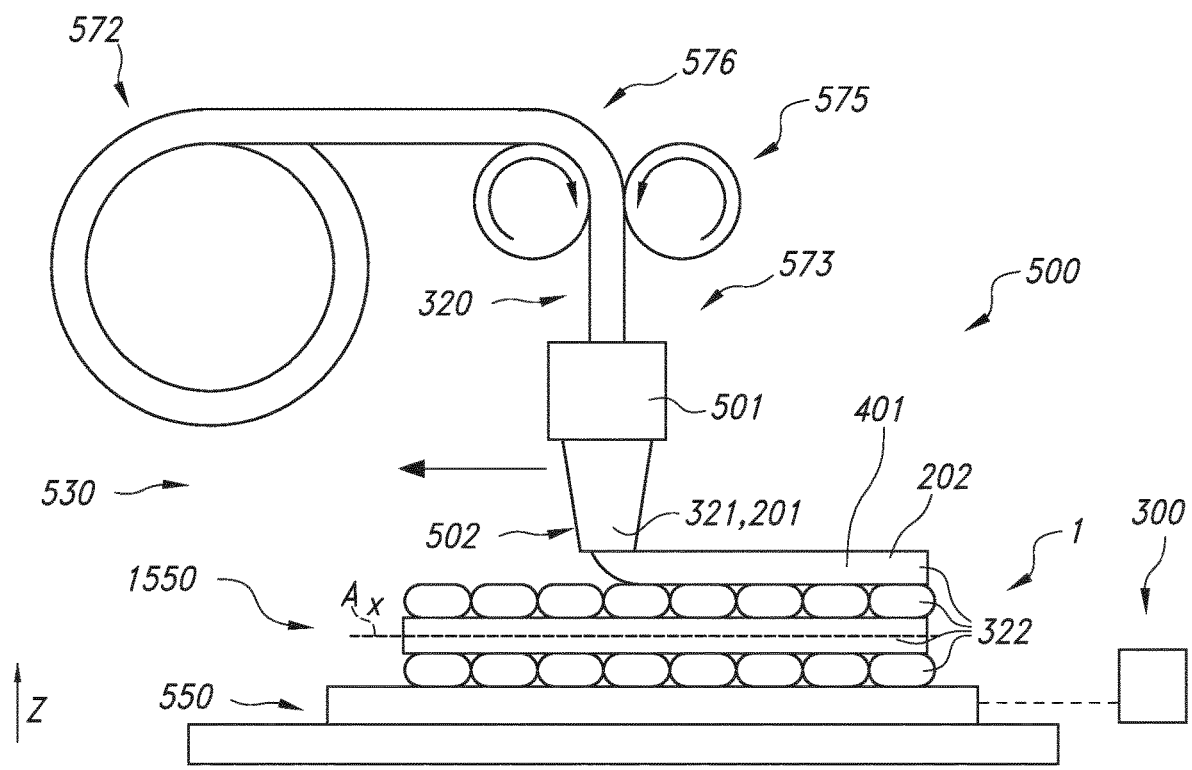
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layers 322 comprises 3D printable material 201, such as having a melting point Tm. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322 and/or layer 322t on layer 322, a 3D item 1 may be formed. Reference 575 indicates the filament providing device, which here amongst others include the spool or roller and the driver wheels, indicated with reference 576.

Reference A indicates a longitudinal axis or filament axis.

Reference 300 schematically depicts a control system, such as especially a temperature control system configured to control the temperature of the receiver item 550. The control system 300 may include a heater which is able to heat the receiver item 550 to at least a temperature of 50° C., but especially up to a range of about 350° C., such as at least 200

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
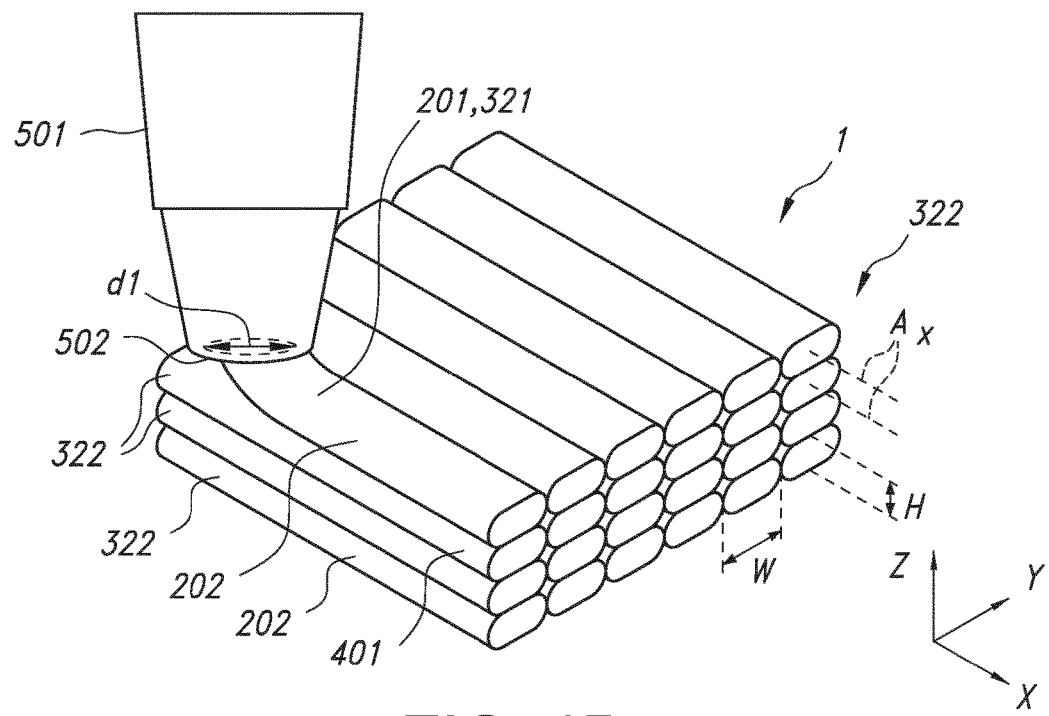

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
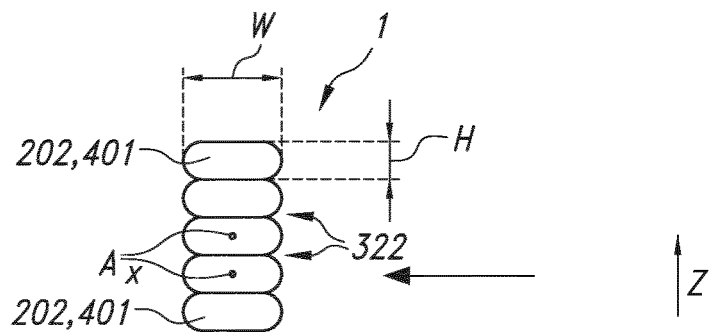

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated. FIG. 1c very schematically depicts a single-walled 3D item 1.

As indicated above, the invention is especially directed to sensing possible 3D printing problems, and where necessary terminating the 3D print process.

Amongst others, in embodiments it is aimed at a real-time machine vision-based automated printing execution monitoring based on observing the part-in-progress with real-time optical sensor data (processing) and/or based on a feedback loop, providing alerting of printing anomalies, e.g. to staff, and/or by automated interventions in the printer process execution.

The detection of anomalies in the printing process is based on the monitoring. In an example, the real-time optical sensor data comprsies images which may be either directly taken by the optical sensor such as a camera or indirectly capturing the view from an optical element such as a mirror or mirrors (of any number or shape). With such imaes (optical sensor data), the printing process may be monitored from a plurality of sides (angles) and hence provides better monitoring. An example of the optical sensor is a camera. The feedback loop may be analysis of optical sensor data at the optical sensor or at the printer. The analysis may be performed external to the sensor or printer such as cloud, server device etc.

The alert may be a signal providing information about the presence of the anomaly and/or type of anomalies. In an advance example, the alert may comprise the location of the anomalies. The anomaly may be a single defect or a plurality of defects. The signal may be an output of the monitoring. The automated intervention may aim at correcting the anomalies.

A direct (primary) method is to 'watch' the process and the fabricated part and decide real-time on the quality of the printing execution; for several hundreds of printers this cannot be done by one or even many human operator(s). A promising technique is to monitor the printing process with computer vision and use machine learning/AI algorithms for detecting in 'real-time' anomalies and take the necessary actions. A solid evaluation however demands observing the product with a full view from all sides) (360°, typically requiring multiple cameras on each printer, and with these cameras having the product in Line-of-sight (so most probably with the cameras subjected to the high-temperature environment inside the 3D printer). In this invention, a relative simple method is proposed which may be used for all kinds of 3D printer equipment. In embodiments, monitoring the printing process with vision, from all angles (360° view), with solving the mentioned issues of high temperatures affecting the camera(s), is herein provided.

In embodiments the invention may even e.g. use a consumer grade camera, or an industrial basic camera module, outside of the high temperature chamber of the 3D printer, combined with passive optical elements as to provide images of the printed part to that single camera. The processing of the captured vision information (still images or video) may be real-time executed using open source algorithms (cf. references of academic papers). Such data processing also includes e.g. dealing with image deformation because of the optical elements (which can be predicted or pre-calibrated).

Hence, amongst others a view on the object that is being printed may be desired. Defects (anomalies versus the expected/envisioned printing result) may be of different nature and may be grouped in e.g. the following classes: (a) defects happening at the filament deposition level/moment of deposition, e.g. missing filament, no adhesion of the filament, thin or thick filament deposition, hole or burr formation, etc., (b) defects happening elsewhere, e.g. detach of the printed part from the build plate, collapse or full delamination of the printed part because of build-up stress or at cool down; and (c) deviations of the shape versus the expected shape (e.g. due to insufficient control/knowledge of reaction shrink) A substantially full view of the product might therefore be desirable as to detect all defect types, although one might also decide to focus on one group of defects only. However, less than a full view may also already be useful to sense problems.

In embodiments, an approach is to place a single camera outside of the printer, with an optical access (viewing) into the printer via a single window. Such window also allows easy cleaning without affecting the camera optics. The camera looks into the printer, and may in embodiments capture (partly) images of 2 types: (a) a direct view of the printed part (and the mechanical elements of the printer itself, such as the printer head, the extruded filament, the printer bed, etc.); and (b) an indirect view of the printed parts via capturing the view from an optical element such as a mirror or mirrors (of any number or shape). The mirror(s) allow views that are not in the LOS of the camera. The mirrors can be with varying optical axis, be distributed in space, etc. as to provide the required image to the camera sensor. The mirrors might be flat, parabolic, or any other shape as required.

The direct view and the indirect view(s) are received at the camera sensor and should not be overlapping. Therefore, this direct view and indirect view can be separately used in the image processing.

Figure 2A:
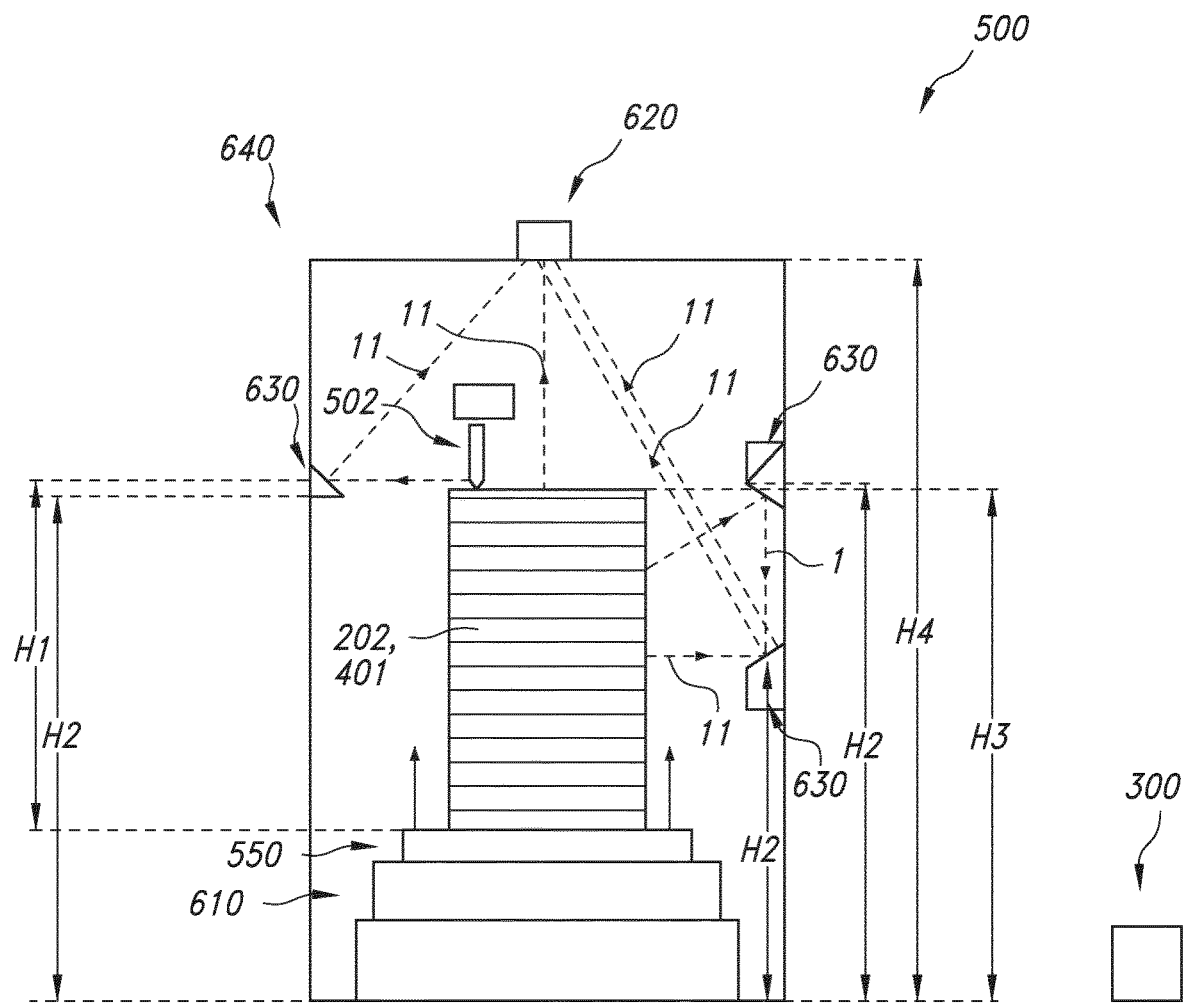
FIGS. 2a-2c schematically depict some further aspects. The schematic drawings are not necessarily to scale.

In an example of a set-up, a top-mounted camera (centrally placed) that has a view into the printer via a window on the interface to the inside of the printer is considered, see also FIG. 2a. Herein, essentially only functional parts are shown, and the drawing is not to scale and geometrically not exact. The camera may have the top plane of the printed part (in progress) in direct view, and possible (in early phase of printing) also the printer bed. At the beginning of the printing process, the printer bed can therefore be observed, and its images analyzed, allowing to decide on e.g. cleanliness of the printer bed and the fit for starting the printing process. The top view of the printed parts may allow to see lateral deviations of the printed parts, e.g. allowing to detect point-anomalies, or allowing to compare the size of the printed part (top view) with the envisioned (as designed) object. Around the printed/printing part we apply a 'set' of mirrors or other optical elements that provide a side view onto the printed part. The vertical (height) position of the printer head (that extrudes the filament and deposits the filament to the printing part) is fixed in certain types of printers, and we require at least a side view on that location from multiple angles around the printed object to be able to detect filament delamination anomalies. Quite simple angled mirrors, composed into multi-facets or in the form of a ring-shaped mirror, can provide such side view by choosing the correct angle of the optical axis versus the camera entrance.

As mentioned, the printer head may in embodiments be fixed in z-direction, but the printing bed is moving downwards during the printing process. In order to also monitor the sides of the printed parts 'after printing' (so observing the previous deposited layers) one can also create a view 'downwards' to these layers. For that to be possible, a more complex (composed) mirror construction is required, with a somewhat more elaborated optical pathway, typically requiring at least one additional (opposite the first element) re-directing optical element in the optical pathway. The mentioned functionality here, with a direct view, a side view and an angled (downward looking view) can be implemented as a single unit, a combined integrated unit or a versatile modular unit. Depending on the targeted defect type, a choice can be made on the optical element one uses.

However, other camera positions can be selected, depending on the printer geometry and printer build-up. For example, the camera might be mounted on the side of the printer chamber, looking horizontally into the printer chamber.

In embodiments, the passive optical structure might be attached to the printer frame, at the height of the extrusion nozzle. Amongst others, an easy click-on method is suggested, that is such that the moving printer bed is not obstructed, that the alignment is pre-defined, and that easy maintenance can be done. Alternatively, the optical structure might be attached to the housing of the printer. However, the passive optical structure might also as well be attached to the mechanical support and actuation part of the print bed. Yet, in embodiments the passive mirror structure might also be attached to the suction hood instead, but such set-up might suffer from inaccurate placement.

In embodiments, the printer head and any part of the printer hardware, either in LOS or visualized via optical means for non-LOS, can be imaged and analyzed with the single camera.

In embodiments, a window for the camera might be made easy-clean type (e.g. by using hardened glass) or might be made easily replaceable.

In specific embodiments, the passive optical elements might act as the backbone for additional (if required) lighting functionality (for improving the images/securing the data processing functionality). Such lighting functionality might be passive (based on a light source outside of the printer) or active.

In specific embodiments, waveguide optical elements for providing the optical pathway might be used as well, instead of mirrors elements.

In yet further embodiments, using a ToF (time of flight) enabled camera module would also allow to real-time measure the distance from camera to the printing build plate. In embodiments, using a LIDAR or laser scanner module would also allow to real-time measure distance information with respect to the printing build plate.

In embodiments, the optical elements can also be used to create two or more different camera viewpoints directed at the same location. Depending on the illumination conditions (e.g. striking illumination), the different viewpoints with the specific illumination could emphasize printing defects based on light shadowing caused by such printing defects. In embodiments, the optical elements can also be used to create two or more different illumination effects on the printed objects.

Figure 2B:
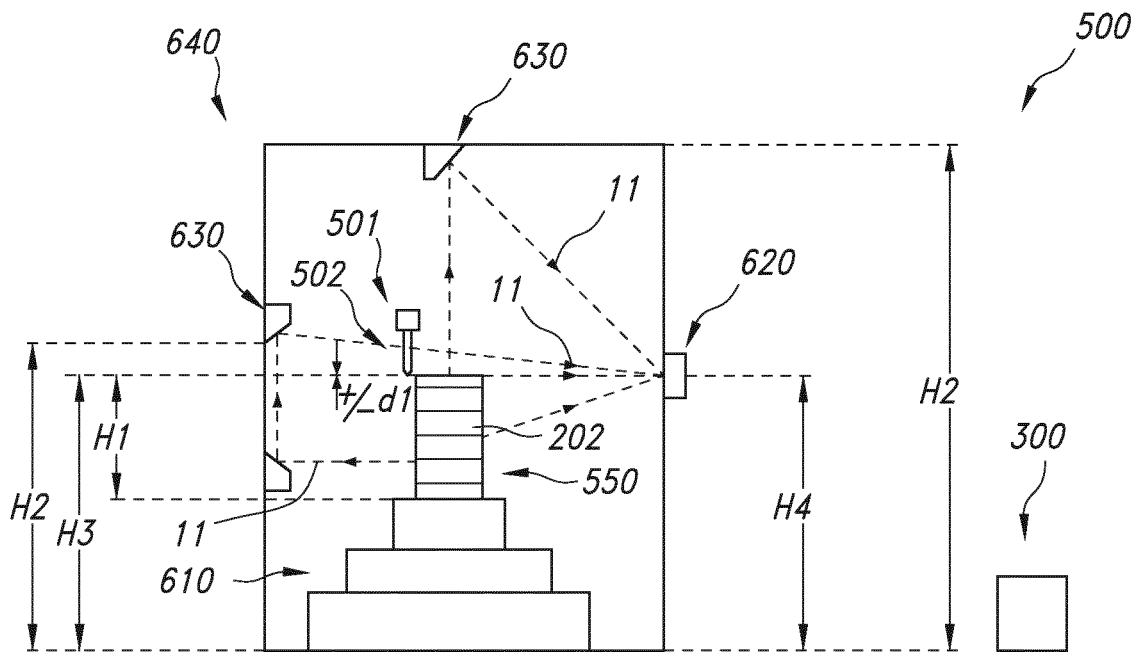
Figure 2C:
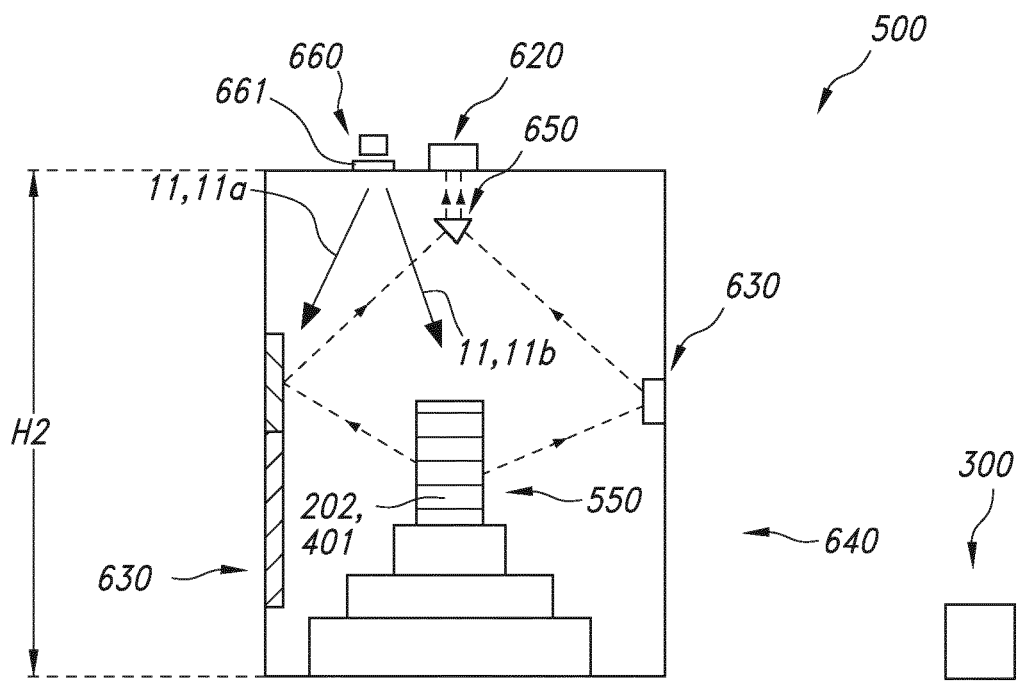

FIGS. 2a-2c schematically depict embodiments of a fused deposition modeling 3D printer 500. The 3D printer comprises (i) a printer head 501, (ii) a 3D printable material providing device 575 (see FIG. 1a), (iii) an actuator 610 for moving one or more of (a) the printer head 501 and (b) a receiver item 550, (iv) an optical sensor 620, and v) n optical elements 630. As indicated above, n≥1, especially at least 2, like up to about 10.

In an operational mode of the fused deposition modeling 3D printer 500, the optical sensor 620 senses one or more of (i) reflection of radiation 11 at 3D printed material 202 on the receiver item 550, (ii) reflection of radiation 11 at at least one of the n optical elements 630, and (iii) transmission of radiation 11 through at least one of the n optical elements 630. This is schematically depicted in FIGS. 2a-2b. In this way, the sensor 620 may sense at least part of a space between the receiver item 550 and the printer head 501. Further, during the operational mode at least one of the group of optical elements 630 and the optical sensor 610 may be configured at equal heights or higher than a printer nozzle 502 functionally coupled to the printer head 501. The height may be determined to a support on which the 3D printer 500 is configured. Height H2 refers to the height of the optics 630, for instance to a central part of such optics. Height H3 refers to the height of the item 1 to the base or to the height of the printer nozzle 502 relative to the support on which the 3D printer is configured. Height H4 indicates the height of the sensor 620 relative to this support. Height H1, however, indicates the total height of the 3D printed item 1 (under construction). Hence, this height H1 may increase with time.

As schematically depicted in the embodiments of FIGS. 2a-2c, in embodiments n≥2. Further, as schematically depicted in these drawings, during the operational mode at least two of the optical elements 630 and the optical sensor 620 are configured at different heights.

With reference to also FIG. 1b, the printer nozzle 502 has a nozzle opening size d1. Especially, the equal height is defined as a maximum height difference of +/−d1 between (a) the at least one of the group of optical elements 630 and (b) the optical sensor 610 and the printer nozzle 502, see also FIG. 2b As schematically depicted in FIGS. 2a-2c, in these embodiments the actuator 610 is configured to move the receiver item 550, and wherein the optical sensor 620 and n optical elements 630 have a fixed height.

Further, as schematically depicted in FIGS. 2a-2c, in embodiments the n optical elements 630 comprise reflective optical elements which are reflective for the radiation 11.

As also schematically depicted in FIGS. 2a-2c, the fused deposition modeling 3D printer 500 further comprises an enclosure 640, wherein the printer head 501 is configured within the enclosure 640. Especially, in embodiments the optical sensor 620 may be configured external of the enclosure 640. Especially, the enclosure 640 is transmissive for the radiation 11. Further, in embodiments (one or more of) the n optical elements 630 are configured within the enclosure 640. The phrase ", the enclosure 640 is transmissive for the radiation 11" may also indicated that part of the enclosure 640 is transmissive for the radiation 11.

In the schematically depicted embodiments of FIGS. 2a-2c, the optical sensor 620 may be configured at equal height or higher than the printer head 501. Further, at least one of the optical elements 630 is configured lower than the printer head 501.

Referring to FIGS. 2a-2c, in embodiments the optical sensor 620 in combination with at least one of the optical elements 630 may especially be configured to sense during the operational mode one or more of (i) the printer nozzle 502, (ii) extrudate 321 (see FIG. 1a) escaping from the printer nozzle 502, and (iii) at least part of 3D printed material 202 on the receiver item 550.

In FIG. 2b, also the +/−d1 range is indicated.

Referring to FIG. 2c, the fused deposition modeling 3D printer 500 may further comprise a second optical element 650 configured downstream of the optical sensor 620. In the operational mode of the fused deposition modeling 3D printer 500 the second optical element 650 may be configured (i) to receive radiation 11 from at least two of the n optical elements 630 and (ii) to guide to different parts of the optical sensor 620 (respectively).

Alternatively (or additionally), in the operational mode of the fused deposition modeling 3D printer 500 the second optical element 650 may be configured to temporarily separate different polarizations of the radiation 11.

FIG. 2c also schematically depicts an embodiment wherein the fused deposition modeling 3D printer 500 further comprises a radiation device 660 configured to generate radiation 11, wherein the radiation device 660 is configured to irradiate one or more of (i) the n optical elements 630, (ii) the 3D printed material on the receiver item 550, and (iii) the printer nozzle 502. Especially, the radiation device 660 is configured to direct different types of radiation 11 to different parts of the fused deposition modeling 3D printer 500 (and the 3D printed material). To this end, an optical element 661 like a color filter and/or polarization filter may be applied. Especially, the radiation 11 is selected from the group consisting of UV radiation, visible radiation, and infrared radiation.

In embodiments, the optical sensor 620 comprises a camera. In alternative embodiments, the optical sensor 620 comprises one or more of a laser scanner and a LIDAR.

As schematically depicted, the fused deposition modeling 3D printer 500 may further comprise a control system 300 configured to control the fused deposition modelling printer 500 in response to a sensor signal of the optical sensor 620. In specific embodiments, the control system 300 is configured to detect 3D print failures on the basis of the sensor signal of the optical sensor 620 and to terminate a 3D printing process, accordingly.

Hence, in this way the invention also provides a method for producing a 3D item 1 by means of fused deposition modelling, using a fused deposition modeling 3D printer 500 (such as described above) comprising (i) a printer head 501, (ii) a 3D printable material providing device 575, (iii) an actuator 610 for moving one or more of (a) the printer head 501 and (b) a receiver item 550, (iv) an optical sensor 620, and v) n optical elements 630, wherein n≥1; wherein the method comprises: (1) a 3D printing stage comprising layer-wise depositing (an extrudate 321 comprising) 3D printable material 201, to provide the 3D item 1 comprising 3D printed material 202 on the receiver item 550, wherein the 3D item 1 comprises a plurality of layers 322 of 3D printed material 202; and (2) sensing at least part of a space between the receiver item 550 and the printer head 501 with the optical sensor 620, and the n optical elements 630.

Further, FIG. 2c also schematically depicts an embodiment of an elongated optical element 630, like an elongated reflector. This may enlarge the (indirect) line of sight of the optical sensor 620.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on Tg or Tm of the material(s).

Hence, amongst others the invention provides a set-up for visual monitoring of the printer process from multiple angles in low cost printers, based on a single camera that is mounted outside of the printer combined with a passive optical set-up (the mentioned optical elements) inside the printer (that is not vulnerable to the high temperature inside the printer). This set-up is low cost and therefore a desirable solution.

The invention claimed is:

1. A fused deposition modeling 3D printer of a real-time machine vision-based automated printing execution monitoring, rising:
   (i) a printer head,
   (ii) a 3D printable material providing device, (iii) an actuator for moving one or more of (a) the printer head and (b) a receiver item,
(iv) an optical sensor, and
(v) n optical elements having reflective optical elements, wherein n≥1; wherein the optical sensor comprises a camera; and wherein:
in an operational mode of the fused deposition modeling 3D printer the optical sensor is arranged for sensing one or more of (i) reflection of radiation at 3D printed material on the receiver item, (ii) reflection of radiation at at least one of the n optical elements, and (iii) transmission of radiation through at least one of the n optical elements, thereby sensing at least part of a space, including parts that are not directly in line of sight of the optical sensor, between the receiver item and the printer head;
during the operational mode at least one of the group of optical elements and the optical sensor are configured at equal heights or higher than a printer nozzle functionally coupled to the printer head;
wherein the monitoring is based on observing the part-in-progress with real-time optical sensor data and/or feedback loop; and
wherein the fused deposition modeling 3D printer is further arranged for providing alert of printing anomalies and/or automatically intervening in the printer process execution; and
wherein the reflective optical elements are reflective for the radiation, the actuator is configured to move the receiver item, and the optical sensor and n optical elements have a fixed height.

2. The fused deposition modeling 3D printer according to claim 1, wherein n≥2, and wherein during the operational mode at least two of the optical elements and the optical sensor are configured at different heights.

3. The fused deposition modeling 3D printer according to claim 1, wherein the fused deposition modeling 3D printer further comprises an enclosure, wherein the printer head is configured within the enclosure, wherein the optical sensor is configured external of the enclosure, wherein the enclosure is transmissive for the radiation, and wherein the n optical elements are configured within the enclosure.

4. The fused deposition modeling 3D printer according to claim 1, wherein the optical sensor is configured at equal height or higher than the printer head, and wherein at least one of the optical elements is configured lower than the printer head.

5. The fused deposition modeling 3D printer according to claim 1, wherein the optical sensor in combination with at least one of the optical elements is configured to sense during the operational mode one or more of (i) the printer nozzle, (ii) extrudate escaping from the printer nozzle, and (iii) at least part of 3D printed material on the receiver item.

6. The fused deposition modeling 3D printer according to claim 1, further comprising a second optical element configured downstream of the optical sensor, wherein in the operational mode of the fused deposition modeling 3D printer the second optical element is:
configured (i) to receive radiation from at least two of the n optical elements and (ii) to guide to different parts of the optical sensor; or
configured to temporarily separate different polarizations of the radiation.

7. The fused deposition modeling 3D printer according to claim 1, wherein the radiation is selected from the group consisting of UV radiation, visible radiation, and infrared radiation.

8. The fused deposition modeling 3D printer according to claim 1, further comprising a radiation device configured to generate radiation, wherein the radiation device is configured to irradiate one or more of (i) the n optical elements, (ii) the 3D printed material on the receiver item, and (iii) the printer nozzle.

9. The fused deposition modeling 3D printer according to claim 7, wherein the radiation device is configured to direct different types of radiation to different parts of the fused deposition modeling 3D printer.

10. The fused deposition modeling 3D printer according to claim 1, further comprising a control system configured to control the fused deposition modelling printer in response to a sensor signal of the optical sensor.

11. The fused deposition modeling 3D printer according to claim 10, wherein the control system is configured to detect 3D print failures on the basis of the sensor signal of the optical sensor and to terminate a 3D printing process, accordingly.

12. A fused deposition modeling 3D printer of a real-time machine vision-based automated printing execution monitoring, comprising:
(i) a printer head,
(ii) an enclosure,
(iii) a 3D printable material providing device,
(iv) an actuator for moving one or more of (a) the printer head and (b) a receiver item,
(v) an optical sensor, and
(vi) n optical elements, wherein n≥1; wherein the optical sensor comprises a camera; and wherein:
in an operational mode of the fused deposition modeling 3D printer the optical sensor is arranged for sensing one or more of (i) reflection of radiation at 3D printed material on the receiver item, (ii) reflection of radiation at at least one of the n optical elements, and (iii) transmission of radiation through at least one of the n optical elements, thereby sensing at least part of a space, including parts that are not directly in line of sight of the optical sensor, between the receiver item and the printer head;
during the operational mode at least one of the group of optical elements and the optical sensor are configured at equal heights or higher than a printer nozzle functionally coupled to the printer head;
wherein the monitoring is based on observing the part-in-progress with real-time optical sensor data and/or feedback loop;
wherein the fused deposition modeling 3D printer is further arranged for providing alert of printing anomalies and/or automatically intervening in the printer process execution; and
wherein the printer head is configured within the enclosure, the optical sensor is configured external of the enclosure, the enclosure is transmissive for the radiation, and the n optical elements are configured within the enclosure.

* * * * *